United States Patent [19]
Carter

[11] Patent Number: 4,528,890
[45] Date of Patent: Jul. 16, 1985

[54] AIRBORNE STORES ARMING TRIGGER UNIT

[75] Inventor: William R. Carter, Jamestown, N. Dak.

[73] Assignee: Western Gear Corporation, Jamestown, Md.

[21] Appl. No.: 528,490

[22] Filed: Sep. 1, 1983

[51] Int. Cl.³ .............................. F41F 5/02
[52] U.S. Cl. .................. 89/1.55; 294/82.26
[58] Field of Search ........... 89/1.5 D, 1.5 B; 294/83 R

[56] References Cited

U.S. PATENT DOCUMENTS

| | | | |
|---|---|---|---|
| 2,845,003 | 7/1958 | Thomas | 89/1.5 D |
| 2,891,447 | 6/1959 | Buecker | 89/1.5 D |
| 2,897,414 | 7/1959 | Thomas | 89/1.5 D X |
| 2,922,340 | 1/1960 | Wilkie | 89/1.5 D |
| 2,992,594 | 7/1961 | Anderson et al. | 89/1.5 D |
| 3,831,486 | 8/1974 | Yost | 89/1.5 D |
| 3,945,295 | 3/1976 | Robison | 89/1.5 D |
| 3,998,124 | 12/1976 | Milhous et al. | 89/1.5 D |
| 4,088,055 | 5/1978 | West et al. | 89/1.5 D |
| 4,212,225 | 7/1980 | Correll et al. | 89/1.5 D |
| 4,266,462 | 5/1981 | Carter et al. | 89/1.5 D |

FOREIGN PATENT DOCUMENTS

WO82/03272  9/1982  PCT Int'l Appl. ........... 89/1.5 D

Primary Examiner—David H. Brown

[57] ABSTRACT

A stores arming trigger unit for use in airborne launching of stores and including improved means for selection of armed or unarmed launch modes. Such improved means consists of an axially shiftable elongated shaft which is normally biased into a safe launch position, but which shaft is selectively actuatable to move into a live launch position by actuation of a movable plunger of a solenoid.

7 Claims, 4 Drawing Figures

AIRBORNE STORES ARMING TRIGGER UNIT

BACKGROUND OF THE INVENTION

In many types of conventional military aircraft a plurality of bombs may be carried within bomb bays by releasable shackle assemblies or the like, one shackle assembly being provided for each bomb. The shackle assemblies are suitably carried by bomb racks incorporated into the aircraft structure. For example, in a modern B-52 bomber, up to 84 five-hundred pound bombs may be carried in bomb racks within the bomb-bay and an additional 12 seven hundred and fifty pound bombs may be carried under each wing.

The shackle assemblies serve the dual purposes of releasably supporting the respective bombs in proper dropping orientation and also releasably supporting an arming link, lanyard or wire. The arming wire is attached to one or more arming mechanism latches or locks on the bomb and the arming mechanisms on the bomb are inoperative until the lock or latch is released.

The arming wire typically will be releasably retained with respect to a trigger unit which is carried by the shackle assembly. One portion of the arming wire will communicate with a latch or lock device such as a pin which locks a final arming device such as an arming propeller located adjacent the forward end of the bomb. This final arming propeller, which is actuated by airflow, must rotate a predetermined number of revolutions after drop before the bomb will explode. The pin prevents rotation of the final arming propeller until withdrawn from communication therewith by arming wire tension.

A bomb may additionally have a secondary arming mechanism adjacent the bomb fins. For example, barometric devices for air explosions often are provided to render the bomb finally armed when it reaches a predetermined altitude or alternatively, timing devices for delayed explosions may be provided to finally arm the bomb after a preset time has elapsed after drop. Should such a secondary arming mechanism be included other corresponding latch or lock devices are also provided and another portion of the arming wire cooperates therewith to prevent actuation of such secondary arming device until the lock device is released by arming wire tension.

The trigger unit is the means which renders the final and/or secondary arming devices operative. This typically has been accomplished by means of a selectively slidable pin which extends through a closed loop formed in the arming wire. When the bomb is released and drops clear of the shackle assembly the arming wire loop is retained by the pin of the trigger unit and the locking devices secured to opposite ends of the wire are thus withdrawn from the final and secondary arming devices to render them operative.

Should it be desired to abort a mission and drop inoperative or "dud" bombs, for example when mechanical or electrical difficulties with the aircraft require a forced landing or lightening of the cargo load, the trigger unit pin is withdrawn from the loop and the arming wire drops with the bomb. Thus, the arming assemblies are inactivated or inoperative and the bomb will not explode after drop.

Prior arming wire trigger units often work independently of the bomb release shackle assembly and are energized only when it is determined that an inoperative or "dud" bomb is to be released. This arrangement suffers from potential hazards of mechanical or electrical malfunction or human error with the resultant possibility that a live or armed bomb will be dropped when it is desired that a dud bomb be released. In other words, should the trigger pin of such prior trigger units inadvertently not be withdrawn, a live, fully armed bomb will be dropped with potential catastrophic consequences.

One trigger unit which overcomes numerous prior art shortcomings is disclosed in U.S. Pat. No. 4,266,462 as a dual action trigger unit which must respond to the energization of the bomb release mechanism as well as to an independent safety mechanism before a live, fully armed bomb may be released. This arrangement greatly reduces the possibility of dropping live fully armed bombs when a dud release is in fact intended.

Typically, the prior art trigger units include lever type actuators wherein pivoted bar linkage systems are employed to transmit actuating motion to the trigger unit release pin. For example, in the above cited U.S. Pat. No. 4,266,462 a selectively positionable element offers the presence or absence of a fulcrum about which a link is pivotable. In the absence of the fulcrum the link merely pivots about its pivotal connection to the trigger pin upon movement of an actuator link whereas, when the fulcrum is provided, the pivotal link is pivotable about the fulcrum by the actuator link to retract the trigger unit pin and thereby release the arming wire.

BRIEF SUMMARY OF THE INVENTION

It is an object of the present invention to provide for an improved stores arming trigger unit wherein a selectively operable rotary cam provides for retraction or non-retraction of the trigger unit pin upon rotary actuation of a pin shaft assembly through rotation of an attached crank or lever. The mechanical operation of the trigger unit of the present invention is thus simplified over and more reliable than prior linkage type trigger units. The present invention also incorporates a dual actuation release similar to that described in the above cited U.S. Patent in that the trigger requires energization of two independent release mechanisms before a live, fully armed bomb may be launched.

Other advantages of the present invention include compact design, greater reliability especially in dusty and icing environments, and a fail safe operating mode These and other objects and advantages of the invention will be more fully appreciated upon consideration of the following description and the accompanying drawings, in which.

Figure 1:
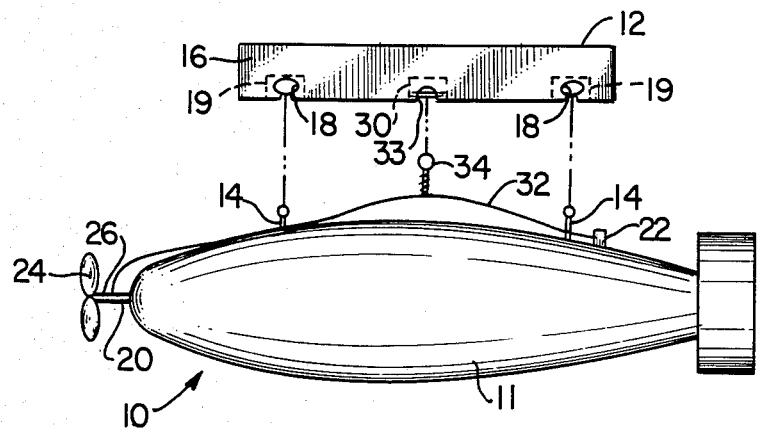
FIG. 1 is a generally schematic exploded side elevation of a bomb and a shackle assembly therefor which includes a stores arming trigger unit of the present invention.

There is generally indicated at 10 in FIG. 1 a bomb and carrier assembly including a stores arming trigger unit 30 according to one presently preferred embodiment of the invention. A bomb 11 is releasably supported by a suitable elongated shackle assembly 12 which is adapted to be suitably secured to well known bomb-bay bomb racks or exterior wing bomb racks of an aircraft (not shown) in the well known manner. Shackle assembly 12 is of a generally well known construction and includes a pair of transversely spaced side plates 16 (only one of which is shown) with suitable transverse struts (not shown) extending between side plates 16 to form a rigid, generally boxlike, hollow structure. Side plates 16 include downwardly open formed openings 18 therein which are longitudinally spaced to coincide with the longitudinal spacing of a pair of support elements such as eye bolts 14 which are secured to the exterior of bomb 11.

Known bomb release mechanisms, schematically illustrated at 19, are received between side plates 16 adjacent openings 18, and eye bolts 14 are cooperable with release mechanisms 19 to releasably support bomb 11 by being received within openings 18 and being retained therein by adjacent elements of the respective release mechanisms 19. When it is desired to release the bomb 11 a suitable bomb release linkage is energized in a well known manner to release the respective elements of mechanisms 19 from supporting contact with eyebolts 14.

After the aircraft is airborne the bombs 11 may be preliminarily armed; however, each bomb 11 will commonly also include a final arming mechanism 20 and perhaps a secondary arming mechanism 22. In FIG. 1 the final arming mechanism 20 is schematically shown as known arming propeller 24 which is rotatably supported by a shaft 26 adjacent the forward end of the bomb 11. Arming mechanism 20 is operable to finally arm the bomb 11 after drop and after a predetermined number of revolutions of propeller 24 have been induced by movement through the ambient air during drop. The secondary arming mechanism 22 may be of the known barometric or timing variety for example, and will further arm the bomb 11 when, during drop, it reaches a predetermined altitude or after a predetermined time lapse after drop.

Both arming mechanisms 20 and 22 are activated or rendered operable by airborne stores trigger unit 30 of the present invention. Accordingly, the selective operation of trigger unit 30 will determine whether or not bomb 11 is dropped in a fully armed mode or in an unarmed or "dud" mode. Trigger unit 30 cooperates with arming mechanisms 20 and 22 by means of a suitable arming link, lanyard or wire 32. As shown, arming wire 32 is simply a length of wire, preferably of copper or the like, which is twisted near its midpoint to form a closed loop 34 which is releasably retained by trigger unit 30. One end of wire 32 forms or is connected to a lock means such as a release pin (not shown) which engages final arming mechanism 20 to prevent arming propeller 24 from rotating. The other end of wire 32 similarly engages secondary arming mechanism 22 to render it inoperative.

The invention herein is primarily directed to the operation and structure of trigger unit 30, the balance of the elements described hereinabove being generally well known in the art both as to operation and structure. Accordingly, further detailed description of such well known elements is not necessary for an understanding of the present invention by those skilled in the art and any such further description will appear hereinafter only as necessary for purposes of describing trigger unit 30.

Figure 2:
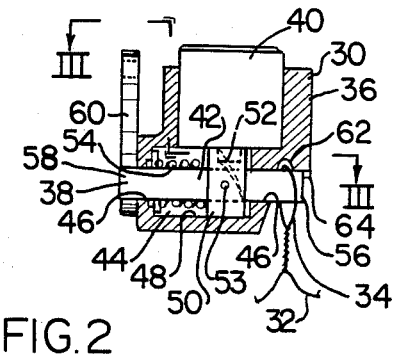
FIG. 2 is a sectioned side elevation of the trigger unit of this invention showing the arming wire release pin in the extended or wire retaining position.
Figure 3:
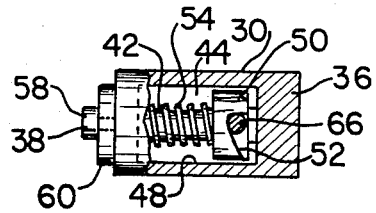
FIG. 3 is a section taken on line III—III of FIG. 2.
Figure 4:
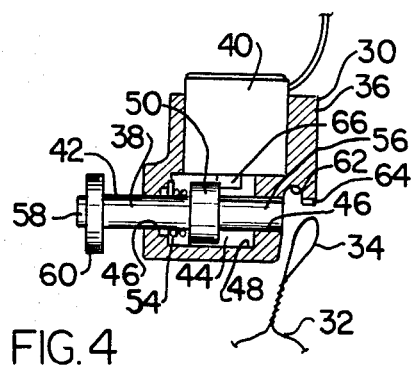
FIG. 4 is a sectioned side elevation similar to FIG. 2 showing the arming wire release pin in the retracted or wire release position.

Side plates 16 include downwardly open formed openings 33 longitudinally intermediate openings 18. Trigger unit 30 is received between side plates 16 adjacent openings 33 and, as shown in FIGS. 2, 3 and 4, comprises a housing or body member 36 which receives therein a rotary camming lever assembly 38 and a solenoid 40 which is positioned in juxtaposition to a cam element 50 carried by lever assembly 38 in a manner and for purposes to be described hereinbelow.

Camming lever assembly 38 includes an elongated shaft portion 42 which is axially slideable within an elongated, generally stepped through bore 44 formed in housing 36. Bore 44 includes axially spaced apart reduced diameter end portions 46 and an enlarged diameter portion 48 extending axially intermediate bore portions 46. Shaft 42 extends throughout the length of bore 44 and a portion thereof residing within enlarged bore portion 48 is encompassed by rotary cam element 50 which has formed on the exterior thereof a helical camming surface 52. Camming element 50 is fixedly secured to shaft 42 as by a pin 53 or other suitable means. Cam 50 is axially foreshortened to permit a range of axial sliding motion of shaft 42 within bore 44. A coil spring 54 encompasses shaft 42 within bore portion 48 and extends axially intermediate cam 50 and one end of bore portion 48 whereby movement of shaft 42 in one axial direction compresses spring 54 and movement thereof in the opposite axial direction permits spring 54 to extend under the impetus of its innate bias. The spring 54 thus tends to bias camming lever assembly 38 in one axial direction and thereby maintain the assembly in an extreme axial position absent any contrary external influence.

Shaft 42 projects outwardly in opposite axial directions from bore 44 to provide adjacent one axial end thereof a trigger portion in the form of a release pin 56 and adjacent the opposite end thereof an actuator portion 58 upon which there is non-rotatably affixed an actuating crank lever 60. Any suitable known linkage arrangement (not shown) may be secured adjacent an outer end of crank 60 to selectively impart rotary motion to shaft 42 for actuation of the trigger 30.

The release pin portion 56 projects from the end of bore 44 opposite crank 60 and cooperates with an arming wire retention window 62 formed by housing 36. The window 62, as shown, includes an upwardly arching concavity formed in housing 36 adjacent one outer end of bore 44.

In the fully extended or arming wire retention position, as shown in FIG. 2, spring 54 biases assembly 38 to the right to a limit defined, as shown, by contact of crank lever 60 with housing 36. The outermost end of release pin portion 56 projects from the end of bore 44 and extends across the width of window 62 to reside closely adjacent a formed, upward concavity 64 which conforms closely to the adjacent upper surface of pin portion 56. The close juxtaposition of pin portion 56 with concavity 64 permits positive retention of wire loop 34 within window 62 by pin 56 when an armed drop is desired. In the retracted position (FIG. 4) pin portion 56 is moved axially such that its extreme outer end is flush with the adjacent outer end of bore 44 to provide a fully open window 62 with no protrusions to retain loop 34. The arming wire 32 thus falls away freely upon drop of the store to provide a safe or unarmed drop thereof.

To provide for the selective retention or release of loop 34 by extension or retraction of pin portion 56, the solenoid 40 is carried by housing 36 in a manner that a solenoid plunger 66 is selectively positionable to engage or disengage cam surface 52. The plunger 66 may be maintained in an extended position, as by a coil spring (not shown) provided within solenoid 40, for engagement with cam 52 in the manner of a cam follower to provide for a safe drop. Actuation of solenoid 40 would retract plunger 66 clear of cam surface 52 against the bias of such a coil spring to provide for an armed drop. Thus, the trigger unit 30 may be considered to be fail safe in that the normal mode is the safe drop mode and a positive action is required to actuate solenoid 40 and thereby permit an armed drop. Should solenoid 40 fail to operate upon actuation thereof, a safe drop will result.

From the above description, the operation of trigger unit 30 will be readily understood. Crank lever 60 is operably connected by suitable links to the operating mechanism for release mechanisms 19. Thus, with each bomb release the associated trigger unit crank 60 is actuated to rotate camming assembly 38 about its axis. When a safe drop is intended, the solenoid 40 is not energized. Therefore, as the lever 60 is rotated, the helical cam surface 52 rides against solenoid plunger 66 thereby displacing assembly 38 to the left (FIG. 4) against the bias of spring 54 and retracting pin 56 from window 62. When full rotation of lever 60 has been achieved, pin 56 is fully retracted to provide a completely open window 62 with no protrusions to prevent arming wire 32 from falling away freely with the store.

When an armed drop of a store is desired, the solenoid 40 is energized to retract plunger 66. With the plunger 66 retracted, there is no reaction surface to engage cam surface 52. Therefore, as lever 60 is rotated upon store drop, the assembly 38 rotates but is not displaced axially and the bias of spring 54 maintains pin 56 in its fully extended position as shown in FIG. 2 whereby loop 34 remains captively retained by pin 56. Thus, as the store falls away the retained arming wire 32 disengages from arming devices 20, 22 and releases the pins, latches, or other arming device lock means to permit arming of the store.

According to the description hereinabove there is provided by the instant invention an improved stores arming trigger unit of compact, simple and reliable structure wherein a fail-safe operating mode provides for release of the store arming wire with zero retention force if the solenoid 40 of the arming trigger is not actuated or if upon actuation, the solenoid 40 fails to operate. The normal or unactuated mode of the trigger unit is the safe drop mode and selection of the armed drop mode always involves actuation of solenoid 40. The rotation of crank 60 imparts only axial rotation to the camming assembly 38 and is not alone able to retract pin 56.

Inasmuch as the above description relates to a presently preferred embodiment of the invention, it is to be appreciated that various alternative embodiments are contemplated. For example, the specific configuration of window 62 may be varied within a latitude of design possibilities as may the specific structure of the stores retention and release device with which the trigger unit 30 is associated. Additionally, the specific camming profile of cam surface 52 may be other than helical in form.

These and other embodiments and modifications having been envisioned and anticipated by the inventors, it is intended that the invention be construed as broadly as permitted by the scope of the claims appended hereto.

I claim:

1. In a store arming trigger unit adapted to selectively retain or release a connecting means associated with an arming device of a store carried by an aircraft, the combination comprising:
   a carrier means;
   an elongated shaft means carried by said carrier means for rotation about a longitudinal axis thereof;
   said shaft means being axially movable with respect to said carrier means into axially spaced retention and release positions to respectively retain or release such a connecting means with respect to said carrier means;
   bias means cooperable with said shaft means to bias said shaft means axially into said retention position;
   cam means cooperable with said shaft means and having a pair of camming surfaces which are biased by said bias means into engagement with each other, said camming surfaces being cooperable to move said shaft means axially against the bias of said bias means into said release position in response to rotation of said shaft means through a predetermined angle of rotation about said axis;
   first actuator means cooperable with said shaft means to selectively rotate said shaft means about said axis including rotating said shaft through such a predetermined angle of rotation with said shaft means moving into said release position;
   and second actuator means selectively operable independently of said first actuator means to selectively disengage said pair of camming surfaces whereby said shaft means remains in said retention position throughout rotation of said shaft means.

2. The combination as claimed in claim 1 wherein said shaft means includes a cam element having one of said camming surfaces thereon.

3. The combination as claimed in claim 2 wherein said cam means includes a movable means having the other of said camming surfaces thereon 4. The combination as claimed in claim 3 wherein said moveable means is fixedly located with respect to axial movement relative to said carrier means.

5. The combination as claimed in claim 3 wherein said moveable means comprises an extensible plunger of a selectively operable solenoid carried by said carrier means.

6. The combination as claimed in claim 5 wherein said moveable means is a free end portion of said plunger.

7. The combination as claimed in claim 6 wherein said bias means includes a coil spring encompassing said shaft means.

* * * * *